Oct. 11, 1949.  R. K. F. BAUMLE  2,484,645
SCREW FASTENER
Filed Oct. 23, 1946
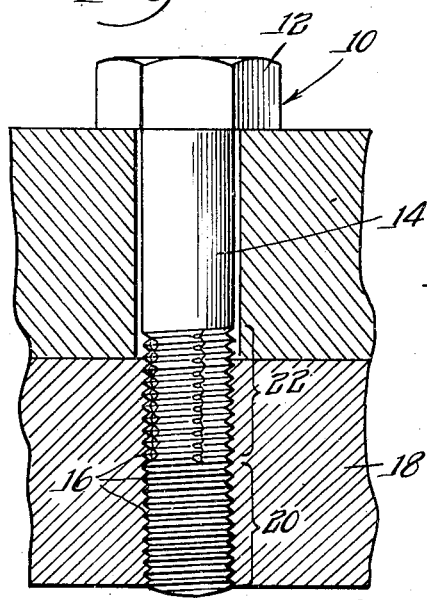
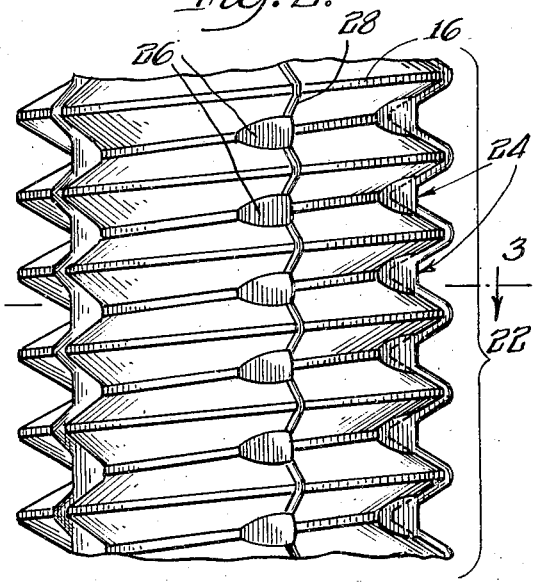
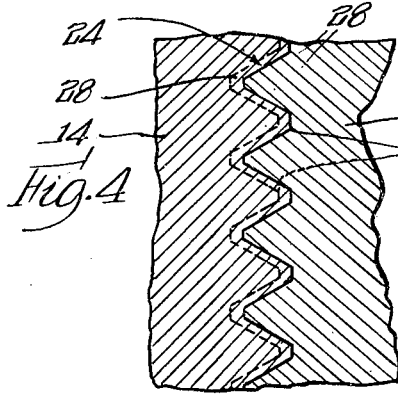
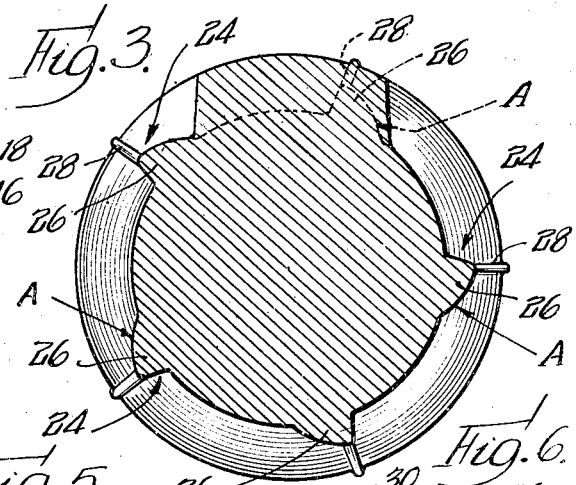
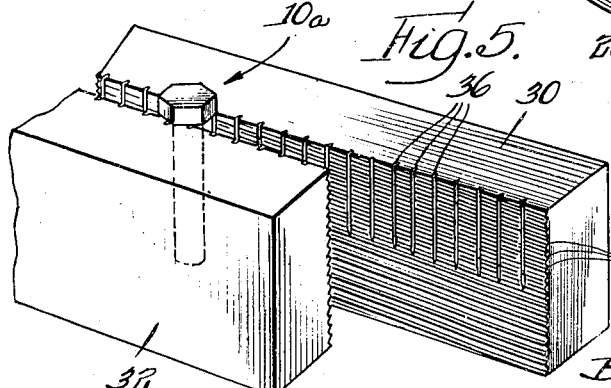
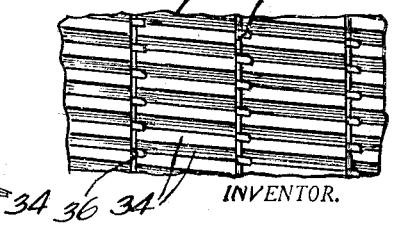
INVENTOR.
Rudolf K. F. Baumle
By: Moore, Olson & Trexler
attys Patented Oct. 11, 1949

2,484,645

UNITED STATES PATENT OFFICE 2,484,645

SCREW FASTENER

Rudolf K. F. Baumle, Chicago, Ill., assignor to Illinois Tool Works, Chicago, Ill., a corporation of Illinois Application October 23, 1946, Serial No. 705,197

2 Claims. (Cl. 85—1)

This invention relates generally to self-locking or self-sealing screws designed for use in conventionally tapped holes, and more particularly to screws which depend for their locking and sealing characteristics upon aggressive impingement with the complementary thread convolutions in the work.

Screws have heretofore been used which are designed specifically to lockingly impinge the crown portions of the complementary thread in the work piece. In this connection reference is made to the prior patent of O. J. Poupitch, No. 2,269,476, wherein the root diameter of the locking section of a screw is increased above the normal root diameter so as to cause aggressive thread impingement when the screw is turned within a conventionally tapped hole in a work piece. The present invention is concerned with a screw which not only lockingly impinges and sealingly engages the crown of the thread in the work, but which also is designed to lockingly and sealingly impinge the side faces of the complementary thread convolutions of the work. In other words, it is an object of the present invention to provide a screw of the type referred to above which is adapted to effect complete sealing between the screw and the work along the complementary thread convolutions thereof.

More specifically, the invention contemplates a self-locking or self-sealing screw as set forth above, equipped with a normal leading section and a locking section, the thread convolutions of which are so arranged as to ensure aggressive locking impingement along the side faces of complementary thread convolutions in a work piece.

The present invention contemplates a screw in which a holding portion is provided with means along the thread convolutions thereof to provide locking and sealing engagement between the side faces of said convolutions with the complementary side faces of the thread in the work.

It is a further object of the present invention to provide a screw as outlined above wherein the ease with which protuberances along the root portion are moved into impingement with the thread in the work is greatly facilitated, and to this end it is proposed to provide a plurality of protuberances, each of which gradually increases in height and thus enables cam-like impingement or contact thereof with the crown of the thread in the work.

The foregoing and other objects and advantages will be more apparent from the following detailed description when considered in connection with the accompanying drawing, wherein:

Figure 1 is a side elevational view of a screw embodying the present invention shown in locking association with a work piece;

Figure 2 is an enlarged fragmentary side elevational view of the holding portion of the screw shown in Figure 1, to more clearly illustrate the circumferentially spaced thread engaging protuberances;

Figure 3 is a transverse sectional view taken substantially along the line 3—3 of Figure 2;

Figure 4 is an enlarged fragmentary sectional view of the complementary thread convolutions of the work and screw, said section being taken longitudinally of the screw;

Figure 5 is a perspective view illustrating the manner in which the protuberances and thread convolutions may be produced contemporaneously by rolling a screw blank between die blocks; and Figure 6 is an enlarged fragmentary view of the working face of one of the die blocks to illustrate those portions of the block which extrude the circumferentially spaced protuberances on the thread convolutions of the screw.

Referring now to the drawing, wherein like numerals have been employed to designate similar parts throughout the various figures, it will be seen that one embodiment of the present invention is shown in association with a screw or bolt designated generally by the numeral 10 in Figure 1. This screw 10 is provided with a head 12 and a shank 14. The lower portion of the bolt 10 is provided with thread convolutions 16. The portion of the thread convolutions 16 which initially enters the threaded aperture of a work piece 18, or, in other words, the entering end of the threaded screw, is designated by the bracket 20 in Figure 1. The remaining or holding portion of the screw is designated by the bracket 22. This holding portion 22 might also be referred to as the locking or sealing portion of the screw, as will be more readily understood from the description which follows.

The entering portion 20 of the screw may be of normal configuration, both in shape and size. That is to say, the thread convolutions on the leading portion 20 conform with normal thread standards, as distinguished from the thread convolutions included within the holding or locking portion 22. This locking section 22 is provided with a plurality of circumferentially spaced protuberances designated generally by the numeral 24. Each protuberance comprises three parts, namely a part positioned adjacent the root of the thread 16 which will hereinafter be referred to as the root part 26, and parts extending outwardly from opposite sides of each root part 26 along the side faces or surfaces of the thread convolution, hereinafter referred to as side protuberance parts 28.

Attention is directed to the fact that the root protuberance parts 26, as shown in Figure 3, rise gradually from the root of the thread to a high point, this gradually rising portion being indicated by the letter A. The parts 28 of the protuberances 24 form a continuation of the crest portion of the surface A and extend outwardly beyond the crest of the threads 16. Thus, as viewed in axial cross section, the protuberances provide a series of connected U-shaped ribs which extend radially beyond the normal diameter of the screw threads 16. Stating it another way, these protuberances project radially beyond the normal diameter of the root, crest and side surfaces of the thread convolutions.

The disposition of the protuberances 24 is such that as the holding portion 22 of the screw is turned into association with the threaded aperture of the work piece 18, the crest, root and side surfaces of the thread convolutions of the work are aggressively contacted by said protuberances. After the screw has been finally driven home, the holding portion of the screw is firmly secured against unauthorized loosening due to the impingement of the protuberances with the thread convolutions of the work piece, and this impingement also provides an effective seal against leakage of fluid along the contacting surfaces of the complementary thread convolutions. The screw of the present invention therefore lends itself to applications where it is not only desirable to secure the screw against loosening, but also to prevent leakage of fluid, such as oil and the like, along the thread convolutions. An example of an environment in which a screw of the present invention would provide a practical solution to the problem of oil leakage is found in oil pans secured beneath the engines of automobiles. This is only one of numerous examples where a self-locking screw, as well as a self-sealing screw, is of practical significance.

The manner in which the above described protuberances 24 lockingly and sealingly engage complementary thread convolutions in the work is clearly illustrated in Figure 4. This figure constitutes an enlarged axial sectional view of the mating convolutions in the screw and work. The above described protuberances may be economically provided in a screw body by the use of thread rolling dies 30 and 32, as illustrated in Figure 5. Longitudinal serrations or teeth 34 in the die blocks cause the thread 16 to be rolled in a screw blank 10a. This has been the conventional method of producing screw threads for many years. At spaced intervals 36 along the die block 30 the serrations 34 are interrupted with configurations which, as the screw blank is rolled between the die blocks, causes the aforesaid protuberances 24 to be extruded. Thus the protuberances can be produced simultaneously with the rolling of the thread on the screw blank. This method of manufacture makes for simplicity and economy.

From the foregoing it will be apparent that the present invention contemplates a self-locking and self-sealing screw of extremely simple, yet practical construction. The ease with which the screw of the present invention may be produced, and the efficient manner in which the protuberances perform their intended function, make it a most practical contribution to the fastening art. The size, shape and number of protuberances will obviously be dependent upon the purpose for which the screw is to be used. Some applications may require a lesser number, and others a greater number of protuberances. Likewise, in some applications it may be advisable to provide protuberances representing axially extending ribs which are less in height than the ribs employed on screws intended to be used under different conditions. By having the locking ribs circumferentially spaced along the thread convolutions of the screw, as distinguished from a continuous root portion of increased diameter, the turning force necessary for applying the screw to the threaded aperture of the work piece is appreciably reduced. It will also be apparent from the foregoing description that the arrangement of the ribs or protuberances is such that the entire thread area, as viewed in cross section in Figure 4, provides a fluid seal. In other words, no leakage of fluid along the contacting thread surfaces will occur because the contacting surface areas of the complementary thread convolutions in the work piece and screw are free from openings or voids through which leakage might otherwise take place. In instances where desired, the screw may be hardened so as to meet the needs incident to its use. Obviously it is preferable to have the thread convolutions of the screw harder than the thread convolutions of the work. This enables the protuberances or locking ribs of the screw to swage or knead surface areas of the thread convolutions of the work so as to provide a very effective lock and seal.

While for purposes of illustration, certain structural embodiments have been disclosed herein, it will be apparent that other changes and modifications may be made without departing from the spirit and scope of the appended claims.

The invention is hereby claimed as follows:

1. A self-locking and sealing screw including a shank having a threaded locking section and a threaded leading section at the entering end thereof, and a plurality of circumferentially spaced integral protuberances projecting radially beyond the normal thread periphery, including root portions interconnecting adjacent thread convolutions of the locking section at the root thereof, said protuberances extending radially beyond the normal root diameter of the screw sufficiently to lockingly inpinge the crown portions of complementary thread convolutions, said protuberances also including portions of limited and of substantially uniform cross section extending continuously from each of said root portions across at least the under surface of said thread convolutions into superimposing relation with respect to the crown thereof, said protuberances serving to prevent helical leakage along the thread surfaces.

2. A self-locking and sealing screw according to claim 1 wherein the integral protuberances include portions of limited cross section extending continuously from each of the root portions across both the upper and under surfaces of each thread convolution, the protuberances traversing said upper thread surface being sufficiently small to permit the thread surface positioned intermediate adjacent protuberances to impinge a complementary thread surface in the work when the screw is tightened therein.

RUDOLF K. F. BAUMLE.

REFERENCES CITED

The following references are of record in the file of this patent:

UNITED STATES PATENTS

| Number | Name | Date |
| --- | --- | --- |
| 1,451,484 | Woodward | Apr. 10, 1923 |
| 1,986,061 | Hill | Jan. 1, 1935 |
| 2,177,003 | Purtell | Oct. 24, 1939 |
| 2,301,181 | Ilsemann | Nov. 10, 1942 |